United States Patent [19]

Buriks et al.

[11] 4,383,926

[45] May 17, 1983

[54] PROCESS OF DEMULSIFYING AND/OR CLARIFYING AQUEOUS SYSTEMS WITH AZETIDINIUM POLYMERS

[75] Inventors: Rudolf S. Buriks; Eva G. Lovett, both of St. Louis, Mo.

[73] Assignee: Petrolite Corporation, St. Louis, Mo.

[21] Appl. No.: 339,522

[22] Filed: Jan. 15, 1982

Related U.S. Application Data

[62] Division of Ser. No. 128,337, Mar. 7, 1980, Pat. No. 4,341,887.

[51] Int. Cl.³ .......................................... C08F 126/00
[52] U.S. Cl. .................................. 210/708; 210/734; 526/263
[58] Field of Search ............... 210/753, 755, 708, 734

[56] References Cited

U.S. PATENT DOCUMENTS

| | | | |
|---|---|---|---|
| 1,947,747 | 2/1934 | Urbain | 210/755 |
| 2,865,960 | 12/1958 | Shearer et al. | 210/755 |
| 3,412,019 | 11/1968 | Hoover et al. | 210/734 |
| 3,585,148 | 6/1971 | Sackis | 210/708 |
| 3,686,151 | 8/1972 | Keim | 210/734 |
| 4,077,930 | 3/1978 | Lim et al. | 210/734 |

Primary Examiner—Harry Wong, Jr.
Attorney, Agent, or Firm—Sidney B. Ring; Hyman F. Glass; Leon J. Bercovitz

[57] ABSTRACT

This invention relates to N,N-diallyl-3-hydroxy azetidinium salts, homo- and co-polymers thereof; and the preparation thereof. This invention also relates to the use of the above polymers as demulsifiers.

4 Claims, No Drawings

PROCESS OF DEMULSIFYING AND/OR CLARIFYING AQUEOUS SYSTEMS WITH AZETIDINIUM POLYMERS

This is a division of application Ser. No. 128,337 filed Mar. 7, 1980, now U.S. Pat. No. 4,341,887.

When diallylamine is reacted with epichlorohydrin the following reaction occurs:

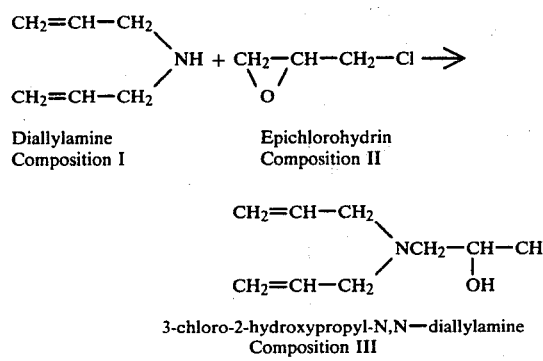

Diallylamine
Composition I

Epichlorohydrin
Composition II 3-chloro-2-hydroxypropyl-N,N—diallylamine
Composition III We have now discovered that when Composition III is heated in the presence of water the following reaction occurs:

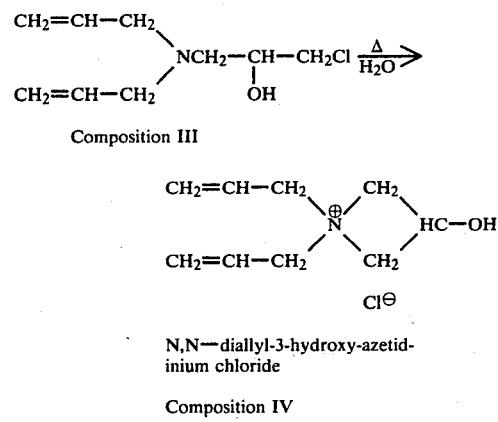

Composition III

N,N—diallyl-3-hydroxy-azetidinium chloride

Composition IV

We have also discovered that Composition IV can be homopolymerized under heat and free radical conditions according to the following idealized equation:

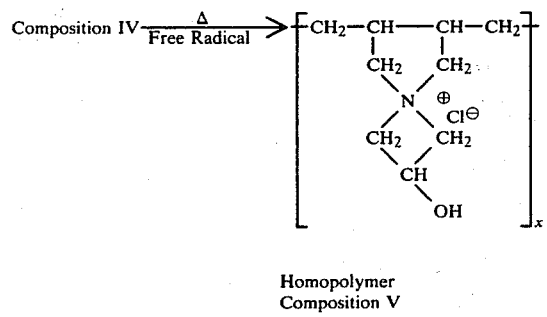

Homopolymer
Composition V

We have also discovered the Composition IV can be copolymerized under free radical conditions with other vinyl-type polymers, i.e., those monomers having a

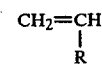

group where R is the residue of the monomer according to the following idealized equation:

Composition IV $\xrightarrow[\text{Free Radical}]{\Delta}$

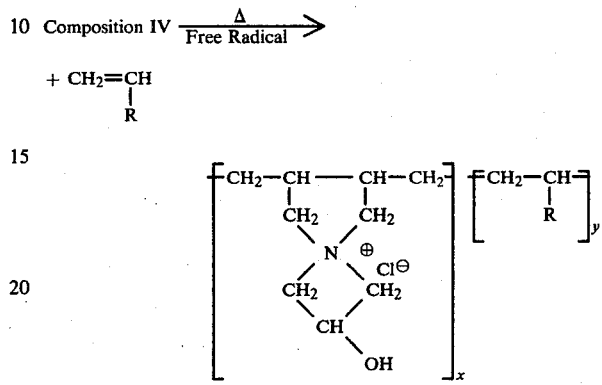

In summary, we have discovered N,N-diallyl-3-hydroxy azetidinium salts, such as halides, etc. and the homo- and copolymers thereof.

In addition, we have discovered a wide variety of uses for these compositions, for example their use as demulsifiers, etc.

The homo- and copolymers are useful in the clarification of aqueous systems, such as by demulsification, flocculation, flotation, etc., of turbid or oily industrial or oil field aqueous systems.

Thus, the novel monomer of this invention, N,N-diallyl-3-hydroxyazetidinium chloride, is obtained by heating the precursor Composition III, namely 3-chloro-2-hydroxypropyl-N,N-diallylamine (CA current name 2-propanol, 1-chloro-3-(di-2-propenylamine)) in water. A synthesis of Composition III is reported in Brit. Pat. No. 602,332 to Eli Lilly and Co., May 25, 1948 (Chem. Abs. 43: P 253i) for use in the synthesis of substituted quinolines. Two patents (Japan Kokai No. 7480,379 (Chem. Abs. 83, 116, 779d (1975) and Japan 71 3k,842 (Chem. Abs. 77, 63295k) discloses copolymers of the hydrochloride salt of Composition III with other diallylammonium salts and sulfur dioxide are useful for differential dyeing of textiles and as antistatic agents for fibers.

Composition III has been prepared in a number of ways from diallylamine and epichlorohydrin. The reaction may be run neat or in solvents with or without $BF_3$ etherate as a catalyst. The best solvents are water, isopropanol and hexane. The reaction temperature should be kept low, below 40° C. A by-product of the reaction is bis-N,N-diallylamino-2-propanol. The Composition II can be vacuum distilled to separate it from the by-product.

The addition of Composition III to water followed by heating for 1-2 hours at 80°-100° results in a homogeneous solution of the azetidinium salt which is suitable for polymerization. The salt is in equilibrium with the covalent Composition III. Removal of the solvent by distillation or freeze drying causes the salt to reconvert to the linear, non-quaternary compound as follows:

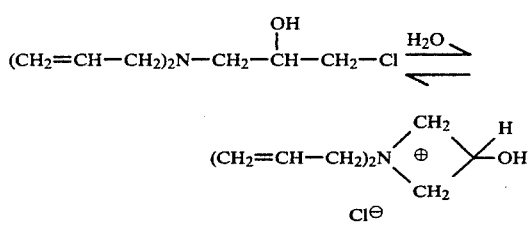

An aqueous solution of the monomer can be prepared by dissolving in water undistilled chlorohydrin which after filtration through paper contains approximately 3% of the by-product bis-N,N-diallylamino-2-propanol.

Composition III is not stable for long periods of time and dimerizes to bis-1,4-diallylamino-p-dioxane.

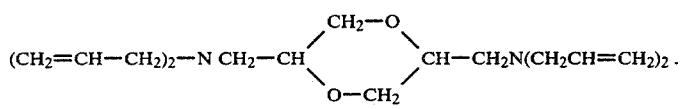

The following examples are presented for purposes of illustration and not of limitation.

EXAMPLE I

Preparation of N-3-chloro-2-hydroxypropyl-N,N-diallylamine

Diallylamine (97.0 g, 1.00 mol), water (97.0 g) and epichlorohydrin (100.0 g, 1.08 mol) were combined and the temperature of the reaction mixture was maintained below 31° for 4.5 hrs. Ether was added to the reaction mixture and the organic phase was separated, dried ($MgSO_4$) and concentrated in vacuo to give 188.9 g. Vacuum distillation afforded 143.6 g (76%), bp 96°–99°/2.2 mm.

The structure assignment is based on the $^1$H and $^{13}$Cnmr spectra given below for the diallyl and diethyl derivatives.

|  |  |  |  | 3.79 exchanges w $D_2O$ |  |  |
|---|---|---|---|---|---|---|
|  |  |  | OH |  |  |  |
| ($CH_2$=CH—$CH_2$)$_2$—N—$CH_2$—CH—$CH_2$Cl |  |  |  |  |  | Solvent |
| $^1$Hnmr | 3.55 | 5.88 | 3.25 | 2.64 | 3.97 | 3.62 |  |
|  | m | m | m | d,J=7Hz | p,J=7Hz | d,J=7 | $CDCl_3$ |
| $^{13}$Cnmr | 118.0 | 135.0 | 57.4 | 56.5 | 67.9 | 47.4 | $CDCl_3$ |

|  | OH |  |  |
|---|---|---|---|
| ($CH_3$—$CH_2$)$_2$—N=$CH_2$ | CH | $CH_2$Cl |  |
| 1.03t | 3.85 | 3.55d |  |
| 2.45d + q | m |  |  |
| 11.9 | 67.7 | 47.5 |  |
| 56.6 |  |  |  |

The two proton doublet at 3.62 in the proton nmr is assigned to the $CH_2Cl$ group and confirmed by the line at 47.5 in the $^{13}C$ spectrum.

Anal. for $C_9H_{16}NOCl$. Calc: C, 56.98; H, 8.50; N, 7.38; Cl, 18.69. Found: C, 56.68; H, 8.28; N, 7.51; Cl 18.96.

Mass spectrum: $M^+ \cdot 189, 191$.

EXAMPLE II

Preparation of N,N-diallyl-3-hydroxy-azetidinium chloride

Diallylamine (97.0 g, 1.00 mol), isopropanol (97 g), and epichlorohydrin (97.0 g, 1.05 mol) were combined. The reaction temperature was maintained below 40° over 3 hrs. Gas chromatography indicated 88% chlorohydrin. A portion (152.8 g) of the reaction mixture was concentrated in vacuo to give 103.8 g. Vacuum distillation afforded 69.1 g (97% pure). A portion of this material (68.4 g) was diluted with 68.4 g of water and refluxed one hour. The solution was filtered through paper to remove water insoluble by-product. This solution was 97% pure azetidinium monomer.

The structure assignment is based on a comparison of the spectral properties with those of N,N-diethyl-3-hydroxyazetidinium chloride [J. H. Ross, D. Baker, and A. T. Coscia, J. Org. Chem., 29, 824 (1964)]. The structures and spectral assignments are given below.

|  |  |  |  |  |  |
|---|---|---|---|---|---|
|  | 3.42 | 4.04d of d |  |  | relative |
| $^1$Hnmr ($D_2O$) | 1.73t | 3.54q | 4.18d of d | 4.83m | to TMSP |
|  | 9.0 | 57.7 |  |  |  |
| $^{13}$Cnmr ($D_2O$) | 8.6 | 55.8 | 70.9 | 59.2 | relative to external TMS |

|  |  |  |  |  |  |
|---|---|---|---|---|---|
|  |  | 4.83m |  |  |  |
|  | 3.99d | 4.25d of d, J + 6Hz |  |  | relative |
| $^1$Hnmr ($D_2O$) | 5.77m | 4.11d | 4.64d of d, J = 7Hz |  | to TMSP |
|  |  | J = 6Hz |  |  |  |
|  | 130.1 | 125.9 | 65.6 |  |  |
| $^{13}$C ($D_2O$) | 129.9 | 125.7 | 63.7 | 70.1 | 59.3 | relative to external TMS |

The unique feature of the proton spectra is the multiplicity and chemical shifts for the azetidinium ring protons. In the $^{13}C$ spectra the line at approximately 70 ppm is characteristic of the azetidinium ring methylene groups. In the proton coupled spectra this line becomes a triplet. An additional feature that confirms the ring structure is the presence of two sets of lines for the acyclic substituents on nitrogen. These arise because the structure is rigid and one group is close to the hydroxyl group on the 3 position and the other is far from it.

Analysis for total chloride on a 50% aqueous solution: Calc., 9.35; Found 9.91. Ionic chloride: Calc., 9.35; Found 8.82.

EXAMPLE III

Preparation of N,N-diallyl-3-hydroxy-azetidinium chloride from precursor

A sample (138.2 g) of the precursor before distillation was combined with 138.2 g of water and refluxed one hour. An immiscible layer was separated, 5.4 g, and identified as 92% bis 1,3-diallylamino-2-propanol. The aqueous layer was 95% pure azetodinium monomer, N,N-diallyl-3-hydroxy-azetidinium chloride.

EXAMPLE IV

Homopolymer

N,N-diallyl-3-chloro-2-hydroxypropylamine (100 g, 0.053 mol, twice distilled in vacuum), and water (10.0 g) were combined in a reaction vessel and purged with $N_2$. A solution of 20 wt % ABIBA* (0.5 cc, 0.00037 mol) was injected and the immiscible solution was heated at 61°–73° for 1 hr. An additional 0.5 cc of ABIBA was added and heating continued. $^1H$ nmr indicated ~62% polymer after 2 hrs. and 88% after 3 hrs. An additional 0.25 cc of ABIBA was added and after 2 hrs. at 58°–65° the solution was too viscous to stir. Water, 40.0 g, was added and the polymer dissolved overnight. It was further diluted with 50.0 g of water to give a pourable solution.

*ABIBA is 2,2'-azobis(2-amidinopropane) hydrochloride.

The $^{13}C$ nmr of this material had the following absorptions relative to external TMS (Tetramethylsilane).

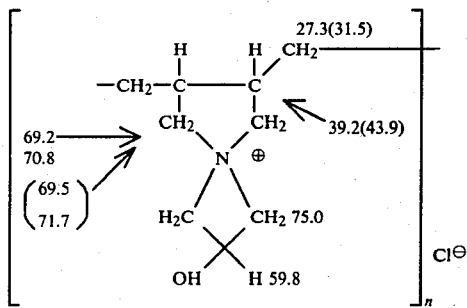

Values in parentheses are for the trans isomer.

These values show that the azetidinium ring is still intact and are in good agreement with the published values for the cyclopolymer derived from N,N-dimethyl-N,N-diallylammonium chloride. J. E. Lancaster, L. Baccei and H. P. Panzer, *Polymer Letters Edition*, 14, 549 (1976)

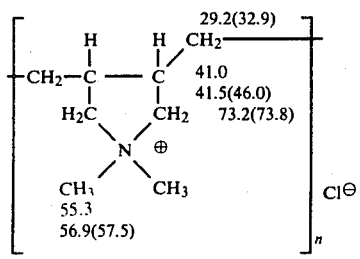

relative to TMSP. [3-(Trimethylsilyl)propionic acid, sodium salt]

EXAMPLE V

Copolymer with Acrylamide

A 50% aqueous solution of N,N-diallyl-3-hydroxyazetidinium chloride (10.0 g, 0.026 mol) and 20 g (0.025 mol) of a solution of acrylamide (3.8 g, 0.054 mol, in 38.4 g of water) were combined, purged with $N_2$ and heated to 79°. Initiation with ABIBA (0.00074 mol) caused an exothermic reaction. After 30 min., $^1H$ nmr showed 43% azetidinium chloride incorporation. The remainder of the acrylamide solution and ABIBA (0.00074 mol) were added. After 9.75 hrs., $^1H$ nmr indicated 13% of azetidinium chloride remained. A solution of acrylamide (0.6 g, 0.0084 mol in 5.6 g of water) and ABIBA (0.00022 mol) was added. The solution became thicker but $^1H$ nmr analysis did not show an appreciable change in the azetidinium chloride incorporation. The final material was 15.5% active.

This phase of the invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-fields emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; oil-in-water emulsions occurring in the cooling water systems of gasoline absorption plants; emulsions of petroleum residues-in-diethylene glycol, in the dehydration of natural gas, etc.

In other industries and arts, emulsions of oily materials in water or other non-oily media are encountered, for example, in sewage disposal operations, milk and mayonnaise processing, marine ballast water disposal. In cleaning the equipment used in processing such products, diluted oil-in-water emulsions are inadvertently, incidentally, or accidentally produced. The disposal of aqueous wastes is, in general, hampered by the presence of oil-in-water emulsions.

Steam distillation and other production procedures sometimes cause oil-in-water emulsions to be produced, from which the valuable oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

Among the most important emulsions of non-saponifiable material in water are petroleum oil-in-water emulsions.

Oil-in-water emulsions contain widely different proportions of dispersed phase. Where the emulsion is a waste product resulting from the flushing with water of manufacturing areas or equipment, the oil content may be only a few parts per million. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

The present process, as stated above, appears to be effective in resolving emulsions containing up to about 20% of dispersed phase. It is particularly effective on emulsions containing not more than 1% of dispersed phase, which emulsions are the most important, in view of their common occurrences.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The demulsifying agents herein described for resolution of oil-in-water type emulsions may be used alone or in combination with other products which also are effective for resolution of oil-in-water emulsions, for example, in combination with electrolytes.

Examples of electrolytes which were found to be suitable are: $FeCl_3$, $ZnCl_2$, $Al_2(SO_4)_3$, $AlCl_3$, etc.

The present reagents are useful, because they are able to recover the oil from oil-in-water-class emulsions more advantageously and at lower cost than is possible using other reagents or other processes. In some instances, they have been found to resolve emulsions which were not economically or effectively resolvable by any other known means.

The reagents may be employed alone, or they may in some instances by employed to advantage admixed with other and compatible oil-in-water demulsifiers.

The process is commonly practised simply by introducing small proportions of reagent into an oil-in-water-class emulsion, agitating to secure distribution of the reagent and incipient coalescense, and letting stand until the oil phase separates. The proportion of reagent required will vary with the character of the emulsion to be resolved. Ordinarily, proportions of reagent required are from 1/5,000 to 1/500,000 the volume of emulsion treated; but more is sometimes required.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description.

The polymers of this invention are useful in the clarification of water containing emulsified oil or suspended oily solids. The application is especially effective for the resolution of oil-in-water emulsions as encountered in oil fields, oil-in-water emulsions resulting from refinery processes and emulsions of cutting and rolling oils from metal working industries. The polymers may be used in simple settling tanks or basins.

FIELD EXAMPLES

It is understood that the following few examples are for illustration purposes only and modifications can be made without departing from the concept of the present invention.

EXAMPLE A

At an oilfield, the homopolymers described in this invention were shown to be very effective in the resolution of a difficult to resolve oil-in-water emulsion. When this emulsion was treated with a solution of a commercial demulsifier in use at this location, good or excellent treatment was obtained at 10 to 20 ppm of chemical. The use of more or less of this demulsifier led to poorly, resolved or overtreated (reemulsified) emulsion. With a solution of comparable strength, prepared from the homopolymer (prepared according to Example IV) good to excellent resolution of the emulsion was accomplished with from 5 to 25 ppm of chemical without under- or over-treatment.

EXAMPLE B

An oil-in-water emulsion encountered in Mississippi required resolution. The addition of aluminum solution $[Al_2(SO_4)_3]$ did not result in acceptable water. Application of a solution of an acrylamide-azetidinium copolymer (prepared according to Example V) gave improved treatment. Further testing demonstrated that superior resolution of this emulsion resulted from a combined treatment with [Al$_2$(SO$_4$)$_3$] and this copolymer.

EXAMPLE C

At an oil field in Texas O/W emulsion resulting from a steam flood operation was treated with the solution of a copolymer (as prepared according to Example V). This O/W emulsion of pH 6.8 and a temperature of 145° was readily resolved by a few ppm of a dilute (1% active) solution of the above copolymer. The resulting treated water had a clarity and extremely low oil content comparable, if not superior to, water produced by the commerical demulsifier conventionally applied at that location.

We claim:

1. A process of demulsifying and/or clarifying aqueous systems which comprises treating oil-in-water emulsions with homo and copolymers of N,N-diallyl-3-hydroxy azetidinium halide, formed under free radical conditions where, in the copolymers, one of the monomers of the copolymer is a vinyl monomer.

2. The process of claim 1 where the azetidinium halide polymer or copolymer is an azetidinium chloride polymer or copolymer.

3. The process of claim 1 where the vinyl monomer is acrylamide.

4. The process of claim 2 where the vinyl monomer is acrylamide.

* * * * *

UNITED STATES PATENT AND TRADEMARK OFFICE
CERTIFICATE OF CORRECTION

PATENT NO. : 4,383,926

DATED : May 17, 1983

INVENTOR(S) : Rudolf S. Buriks:Eva G. Lovett

It is certified that error appears in the above—identified patent and that said Letters Patent is hereby corrected as shown below:

Col. 2, Line 59: "II" should be --- III ---

Col. 3, Lines 55-57: "$(CH_3 - CH_2)_2 - N = CH_2\overset{OH}{\underset{|}{C}}HCH_2Cl$" should be --- $(CH_3 - CH_2)_2 - N - CH_2\overset{OH}{\underset{|}{C}}HCH_2Cl$ ---

Col. 3, Line 58: "2.45d" should be --- 2.54d ---

Col. 5, Line 10: "azetodinium" should be --- azetidinium ---

Signed and Sealed this

Twenty-ninth Day of November 1983

[SEAL]

Attest:

Attesting Officer

GERALD J. MOSSINGHOFF

Commissioner of Patents and Trademarks